United States Patent [19]
Sakayori et al.

[11] Patent Number: 4,887,950
[45] Date of Patent: Dec. 19, 1989

[54] WATERPROOF NUT

[75] Inventors: Kiyoshi Sakayori, Kodaira; Shinichi Iwasaki, Musashino; Yozo Ishida, Higashimurayama; Toshikazu Shinogaya, Kodaira; Yuzo Ishizuka, Shiki, all of Japan

[73] Assignee: Bridgestone Corporation, Tokyo, Japan

[21] Appl. No.: 188,492

[22] Filed: Apr. 29, 1988

Related U.S. Application Data

[63] Continuation-in-part of Ser. No. 117,445, Nov. 3, 1987, abandoned, which is a continuation-in-part of Ser. No. 830,867, Feb. 19, 1986, abandoned.

[30] Foreign Application Priority Data

Feb. 22, 1985 [JP] Japan .................................. 60-34176
Jul. 5, 1985 [JP] Japan ................................. 60-148052
Sep. 17, 1985 [JP] Japan ................................. 60-204938

[51] Int. Cl.⁴ ....................... F16B 39/34; F16B 37/14
[52] U.S. Cl. .................................... 411/302; 411/431; 10/86 C
[58] Field of Search ............... 411/371, 377, 429-431, 411/301-303, 542, 903, 907, 908, 910, 914; 10/86 C, 86 R

[56] References Cited

U.S. PATENT DOCUMENTS

| | | |
|---|---|---|
| 1,904,263 | 4/1933 | Berge . |
| 2,018,301 | 10/1935 | Ferry . |
| 2,795,144 | 6/1957 | Morse . |
| 4,316,690 | 2/1982 | Voller ................................. 411/377 |
| 4,373,842 | 2/1983 | Bettini et al. ........................ 411/377 |
| 4,397,437 | 8/1983 | Madej ................................. 411/431 |
| 4,446,186 | 5/1984 | Waragai et al. . |
| 4,452,556 | 6/1984 | Nelson et al. ....................... 411/377 |
| 4,482,278 | 11/1984 | Dorn .................................. 411/377 |
| 4,557,654 | 12/1985 | Masuda et al. ...................... 411/907 |

FOREIGN PATENT DOCUMENTS

| | | |
|---|---|---|
| 1275038 | 9/1960 | France . |
| 53-99261 | 8/1978 | Japan . |
| 58-63428 | 4/1983 | Japan . |
| 830722 | 3/1960 | United Kingdom . |
| 1263548 | 2/1972 | United Kingdom . |

Primary Examiner—Neill R. Wilson
Attorney, Agent, or Firm—Oliff & Berridge

[57] ABSTRACT

A waterproof nut which may be used, for example, inside a water storage tank, is constituted by a metallic nut body having the outer periphery coated with a synthetic resin layer which also covers both the front and rear surfaces of the nut body. The resin layer which covers the rear surface of the nut body includes a cap-shaped portion for accommodating the free end of a bolt which is screwed into the nut body in such a manner that the free end projects from the rear surface of the nut body, whereby water is prevented from entering the nut body.

15 Claims, 9 Drawing Sheets

*Contact amount(mm)

Size: M12 bolt and nut

| Sample No. | Structure |
|---|---|
| 1. |  |
| 2. |  |
| 3. |  |
| 4. |  |

WATERPROOF NUT

BACKGROUND OF THE INVENTION

1. Continuity

This is a continuation-in-part application of U.S. patent application Ser. No. 117,445 filed Nov. 3, 1987 now abandoned, which is a continuation of Ser. No. 06/830,867, filed 2/19/86, now abandoned.

2. Field of the Invention

The present invention relates to a waterproof nut, particularly a resin-coated waterproof nut which may be used, for example, inside a water storage tank, and more particularly to a waterproof nut which may be employed in conditions in which it comes into contact with water or in which a liquid that may produce condensation is present, and which may also be used for a joint or the like in piping.

3. Description of the Related Art

One type of known water storage tank is constituted by panel units which are tightly joined together by means of nuts and bolts which are screwed and tightened thereon. Since the nuts and bolts employed in a high-humidity atmosphere, as in the case of a water storage tank, must be resistant to corrosion, it is general practice to subject such nuts and bolts to plating or chromating, or to make them of a stainless steel material or a synthetic resin material. These anticorrosion treatments, however, cannot prevent corrosion from chlorine gas generated from the water contained in the tank, and even nuts and bolts which are made of a stainless steel material are corroded by this chlorine gas. Nuts and bolts which are made of a synthetic resin material have insufficient mechanical strength for obtaining the desired level of performance, and are therefore unsatisfactory for industrial purposes.

U.S. Pat. No. 4,397,437 to Madej discloses a nut of a beam clamp wherein the nut is encapsulated by a pressure molding process with polyvinylchloride. The polyvinylchloride coating surrounding the nut forms a cap having an elongated body portion which is open at one end. This patent discloses a resilient annular flange 78 that is part of a clamping member rather than a nut. The annular flange 78 of the clamping member contacts the outer surface of the face of the nut body. This cannot be construed as a washer. Moreover, the nut of this patent has no space or groove to receive a washer. Madej patent does not teach an interference fit or a tight fit between an elongated hole formed in a synthetic resin cap-shaped portion and a bolt.

U.S. Pat. No. 4,316,690 to Voller teaches placement of a tapered lip on the underside of the head of a bolt so that the tapered lip would mesh with and seal the threads where the bolt meets a nut. This patent discloses a tapered portion of the head of a bolt rather than a nut. That tapered portion is designed to seal the point of engagement between the bolt and a nut by meshing with the threads. The arrangement of this patent does not enable a flexible packing material, such as a washer, for sealing to be accurately and effectively positioned when a nut is tightened onto a bolt.

A plastic-headed fastener assembly is disclosed in Bettini et al. U.S. Pat. No. 4,373,842. In this patent, an elastic washer is used to protect the under surface of the head of a fastener which is not a nut from moisture and corrosion.

The washer of this patent engages the underside of the head of the fastener but does not engage a synthetic resin outer layer on the head of the fastener. Rather, it engages a pair of flanges 38 as they project from the head of the fastener. This patent relate to a self-drilling and self-tapping fastener which passes through successive panels, and is unrelated to any technology in which a nut is fastened to a bolt.

There is a known method in which, after panel units have been fastened together by nuts and bolts, the nut and bolt assemblies are externally covered with caps made of a resin. This method, however, involves troublesome operations, and has the disadvantage that the caps may come off the nut and bolt assemblies during use.

To overcome these disadvantages, the applicant of the present invention has already proposed an improved waterproof nut (see Japanese Utility Model Laid-Open No. 99998/1984). The structure of this waterproof nut is shown in FIG. 10. More specifically, a cap nut body 20 which has a cap-shaped portion 21 is employed. The surface of the cap-shaped portion 21 is machined so that projections and recesses are formed thereon, and is then coated with a synthetic resin layer 22. This proposed prior art has already been widely used as a nut for, in particular, water storage tanks.

This type of nut, however, necessitates a complicated manufacturing process, which leads to an increase in the production cost. More specifically, the formation of the cap nut body 20 requires much more time and labor than ordinary nut bodies, so that the production cost of the former can be at least ten times that of the latter.

The necessity of providing the cap-shaped portion 21 on the nut body 20 will be explained below.

The nut of the above-described type is generally produced by setting the cap nut body 20 in a mold and charging a synthetic resin into the mold. In this case, if an ordinary nut body with no cap-shaped portion 21 is employed, a core which has the same configuration as that of the bolt which is to be screwed into the completed nut is screwed into the nut body, and the nut body is set in the mold in this state. The synthetic resin is then charged, and, after the resin has hardened, the core is unscrewed from the nut body which is still in the mold.

In this process, it is impossible to prevent the charged synthetic resin (liquid) from entering the small space defined between the nut body and the threaded portion of the core, but any resin in that small space makes it extremely difficult to unscrew the core from the nut body. In order to solve this problem, the cap-shaped portion 21 is formed on the nut body 20, and the synthetic resin is thereby prevented from entering the small space.

In addition, since the inner diameter of the synthetic resin portion is inevitably reduced by mold shrinkage, the thread engagement area between the nut and a bolt may become so tight that the nut cannot be smoothly screwed onto the bolt, which means that the working efficiency of the fastening operation is greatly reduced, and it is not possible to obtain the required clamping force.

SUMMARY OF THE INVENTION

In view of the above-described circumstances, it is an object of the present invention to provide a waterproof nut coated with a synthetic resin, by employing an ordinary nut body.

The present invention provides a waterproof nut comprising a nut body and a synthetic resin layer which covers the nut body, the resin layer covering both the nut body and the front surface thereof as well as defining a cap-shaped portion over the rear surface thereof, the cap-shaped portion accommodating the free end of a bolt which is screwed into the nut.

According to the present invention, a core in the form of a bolt is screwed into a nut body from the front surface thereof in such a manner that the free end of the core projects from the rear surface of the nut body.

In this case, the nut body has an inner diameter which is 0.05 to 0.4 mm larger than the nominal diameter thereof, and the threaded portion of the core has an outer diameter which is 0.02 to 0.1 mm larger than the nominal diameter of the nut body. The engaged nut body and the core are set in a mold which has a section for forming a synthetic resin outer layer which covers the outer periphery of the nut body, another section for forming a front surface covering layer which covers the front surface of the nut body and still another section for forming a cap-shaped portion which covers the rear surface of the nut body. Synthetic resin is then charged into the mold in a state such that the temperature of the nut body and the core is lower than the ordinary molding temperature, and the resin is hardened. Thereafter, the core is unscrewed from the nut body, and a cap-shaped portion is formed over the rear surface of the nut body.

One of the features of the waterproof nut, according to the present invention, resides in the arrangement wherein the nut body is covered with a synthetic resin layer evenly over the front surface thereof. The synthetic resin layer portion covering the front surface prevents the nut body from being separated or removed from the synthetic resin layer when the nut is tightened. This resin layer portion may have a characteristic configuration, such as described later. Another feature of the waterproof nut resides in the cap-shaped portion of a synthetic resin which covers the rear surface of the nut body, the cap-shaped portion being of a size which enables it to accommodate the free end of a bolt which is screwed into the nut. The outer periphery of the cap-shaped portion may be made cylindrical or it may be polygonal, e.g., hexagonal, so that this portion can be held when the nut is tightened.

It is generally considered that the temperature of the mold and the nut body, etc., should be set at a relatively high level during the process of charging the synthetic resin into the mold. With the present invention, therefore, the temperature of the mold itself and the nut body, etc., can generally be about 70° to 100° C. if using a resin such as a polyamide resin (nylon 6,6), although this temperature depends upon the kind of synthetic resin employed. However, according to the present invention, the temperature of the nut body and the core is restricted to within a temperature range lower than that mentioned above, and the molding process is carried out at about 5° to 45° C.

In addition, it is generally recommended that, when molding synthetic resin by injection molding or other similar molding process, the mold and the core should be at a temperature which is as high as possible, from the overall viewpoint of the quality and external appearance of the product. This is because it is necessary to smoothen the flow and hardening rate of the resin charged into the mold. However, the method according to the present invention makes good use of this practice.

More specifically, since it is not preferable that the charged resin flows through the gap between the nut body and the core, the mold and the core are held at a relatively low temperature so that the resin is prevented from entering the gap.

Experiments have shown that when a nylon resin was employed and the temperature of the nut body was set at 80° C., a relatively large amount of resin entered the gap between the nut body and the core, and it was therefore difficult to unscrew the core from the nut body. According to the present invention, however, the core and the nut body are held within the aforementioned relatively low temperature range, so that only an extremely small amount of resin is able to enter the gap, thus facilitating the unscrewing of the core. In addition, the outer diameter of the core and the inner diameter of the nut body are specified as appropriate, to allow for shrinkage of the resin.

It is preferable that the external thread ridge formed on the bolt which is screwed into the waterproof nut and the internal thread ridge formed on the cap-shaped portion of the nut should be in contact with each other to a certain extent, to increase the mechanical strength of the nut and bolt assembly with tight or interference fit. The dimension by which the thread ridges are in contact should be set to 0.4 to 1.4 mm preferably 0.7 to 1.2 mm, in order to obtain an increased mechanical strength and excellent thread engagement.

From the above-described point of view, the dimensions of the core should be selected so that the dimension of the internal thread ridge of the cap-shaped portion is within the aforementioned range. The outer periphery of the cap-shaped portion may be cylindrical, but it is preferably polygonal, e.g., hexagonal, so that this portion can be held when the nut is tightened.

The kind of synthetic resin employed by the present invention is not necessarily limited; it is possible to select any kind of resin which satisfies the strength requirements (for example, when the nut is tightened). Examples include various kinds of synthetic resin, such as polyamide, ester, ether, sulfone and sulfide resins, and more particularly, nylon 6,6, nylon 6, polyethylene terephthalate, polybutylene terephthalate, polycarbonate, polyphenylene oxide, polyoxymethylene, polyether sulfone, polysulfone, polyphenylene sulfide, etc. However, the present invention is, of course, not necessarily limited to the above-mentioned resins.

The selected synthetic resin is melted to form a liquid and is charged into the mold. During this time, the mold and the core are held at an appropriate temperature which depends upon the resin employed. That temperature is generally 70° to 100° C. for a polyamide resin, 60° to 100° C. for an ester resin, 70° to 100° C. for an ether resin, 140° to 180° C. for a sulfone resin, or 110° to 150° C. for a sulfide resin. In the present invention, however, it is necessary to charge the resin in a state wherein the core and the nut body are held at a temperature which is considerably lower than the corresponding temperature range mentioned above. It is preferable that the temperature should be 50° C. or less (preferably 25° to 45° C.) for a polyamide resin, 60° C. or less (preferably 25° to 45° C.) for an ester resin, 55° C. or less (preferably 25° to 45° C.) for an ether resin, 110° C. or less (preferably 25° to 100° C.) for a sulfone resin, or 110° C. or less (preferably 5° to 100° C.) for a sulfide resin.

Of the above-mentioned resins, a polyamide resin (a nylon resin) is most preferable from the overall viewpoint of availability, cost and strength. In addition, it is possible to mix a filler or the like into the resin employed, according to need. For example, glass fibers, carbon fibers, milled fibers, or aramid fibers, may be employed.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
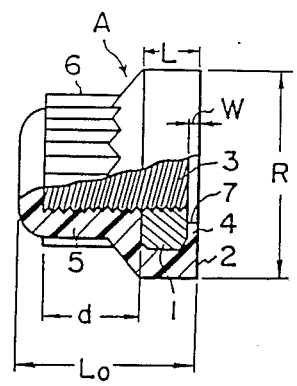
FIG. 1 is a partially-cutaway side view of one embodiment of the waterproof nut according to the present invention.
Figure 2:
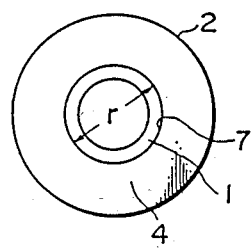
FIG. 2 is a side view of the waterproof nut shown in FIG. 1, as viewed from the right-hand side thereof.
Figure 3:
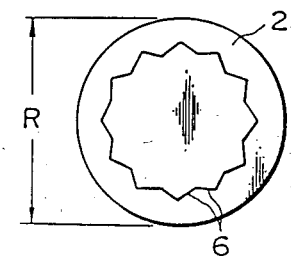
FIG. 3 is a side view of the waterproof nut shown in FIG. 1, as viewed from the left-hand side thereof.

Referring first to FIGS. 1 to 3 which show in combination a waterproof nut A in accordance with one embodiment of the present invention, a nut body 1 is coated with a nylon resin layer 2. The nut body 1 has a hexagonal outer periphery, and an internal thread 3 is cut in the inner peripheral surface of the nut body 1. The nylon resin layer 2 is provided so as to form a front surface covering layer or lip 4 which covers the front surface of the nut body 1 and a cap-shaped portion 5 which covers the rear surface of the nut body 1.

The cap-shaped portion 5 is of a size which enables it to accommodate the free end of a bolt when screwed thereinto. The inner peripheral surface of the cap-shaped portion 5 may be provided with an internal thread which is contiguous with the internal thread 3 cut in the inner peripheral surface of the nut body 1. The outer periphery of the cap-shaped portion 5 may be shaped so that it can be held when the nut is tightened. In the illustrated example, a multiplicity of small projections 6 having a triangular cross-section are formed on the outer periphery of the cap-shaped portion 5.

Figure 4:
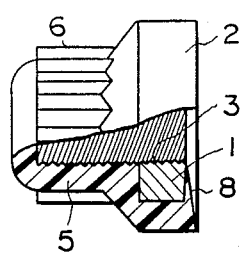
FIG. 4 is a partially-cutaway side view of another embodiment of the waterproof nut according to the present invention.

The inner end of the lip 4 preferably defines a step 7 as shown in FIG. 1, or the thickness of the lpi 4 may be gradually reduced toward the internal thread 3 so as to provide a tapered portion 8 as shown in FIG. 4, in order to accurately and effectively position a packing material (not shown) which may be used when the nut is screwed onto a bolt. If neither the step 7 nor the tapered portion 8 is provided, when the nut is tightened, the packing material may be pressed outwardly to damage the external appearance considerably.

As shown in the drawings, each outer diameter of the nut body 1 and small projection portion 6, that is, the cap-shaped portion 5 is equivalent each other, accordingly, any fastening tool such as a spanner, socket wrench or the like which is applied to the nut body 1 can be used in common to put on the cap-shaped portion 5 to fasten the waterproof nut of the present invention.

Figure 5:
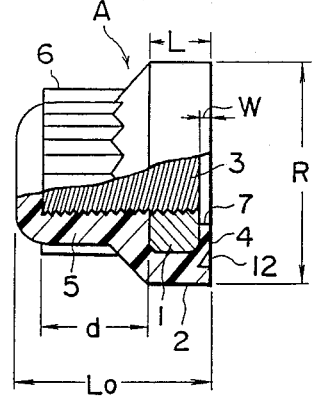
FIG. 5 shows a modification of the waterproof nut according to the present invention which has a ring-shaped groove in the front surface thereof.
Figure 6:
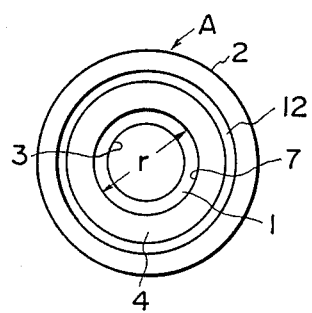
FIG. 6 is a side view of the waterproof nut shown in FIG. 5, as viewed from the right-hand side thereof.
Figure 7A:
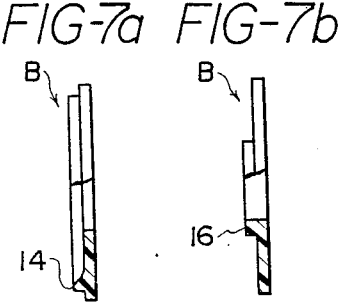
FIGS. 7(a) and 7(b) are sectional views showing washers which may be engaged with the waterproof nuts shown in FIGS. 5 and 1, respectively.

FIGS. 5 and 6 show in combination a nut A which has a ring-shaped groove 12 formed in the front surface of the lip 4. A washer B which is shown in FIG. 7(a) is engaged with the groove 12. The washer B has a ring-shaped projection 14 which is fitted into the groove 12, so that the nut A and the washer B are connected together in one unit and are prevented from separating from each other. The outer diameter of the projection 14 is preferably made slightly larger than the largest diameter of the groove 12.

Figure 7B:

The washer B shown in FIG. 7(b) is provided with a projection 16 which is fitted to the step 7 of the nut A shown in FIG. 1. This washer B is snap-fitted into the nut A in the same manner as in the case of the washer B shown in FIG. 7(a).

In the illustrated example, the nut body 1 is an M12 hexagon nut, in which: the diameter R of the largest-diameter portion, including the nylon resin layer 2, is 30 mm; the inner diameter r of the lip 4 is 14 mm; the length L of the portion whose diameter is R is 7 mm; and the thickness W of the lip 4 is 1 to 3 mm. The substantial diameter of the cap-shaped portion 5 which covers the rear surface of the nut body 1 is 18.9 mm, and twelve projections 6 having a triangular cross-section are continuously formed on the outer periphery of the cap-shaped portion 5, the height of the projections 6 being 1 mm.

The depth d of the cap-shaped portion 5 is 15 mm, and the inner peripheral surface of the cap-shaped portion 5 is provided with an internal thread which is contiguous with the internal thread formed on the inner peripheral surface of the nut body 1. The overall length $L_o$ of the waterproof nut A is 27 to 29 mm. These dimensions, as a matter of course, differ depending upon conditions in which the nut A is used, and performance requirements, and the kind and thickness of resin employed and the type of nut body may be selected as desired in accordance with the use conditions and performance requirements.

Figure 8:
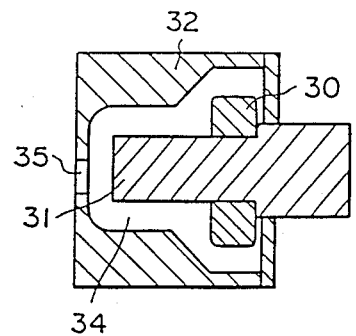
FIG. 8 is a sectional view of a mold, a core and a nut body which are set in the mold, showing an example of the method of manufacturing a waterproof nut according to the present invention.
Figure 9:
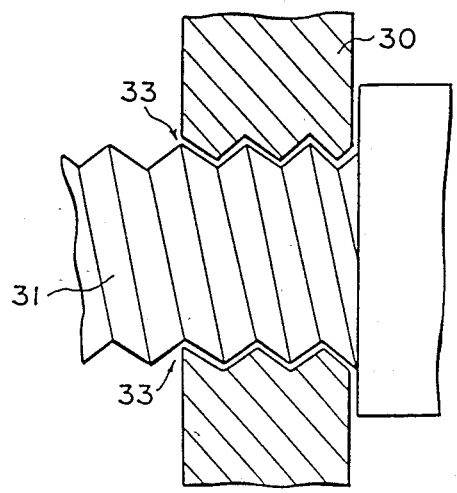
FIG. 9 is an enlarged sectional view of a essential portion of the engaged core and the nut body shown in FIG. 8.
Figure 10:
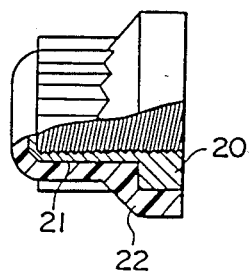
FIG. 10 is a partially-cutaway side view of a conventional waterproof nut.

FIGS. 8 and 9 are sectional views which show in combination the positional relationship between a mold 32, a nut body 30 and a core 31 in manufacturing the waterproof nut according to the present invention. A synthetic resin, e.g., nylon 6,6, is heated at about 270° C. to 280° C. and thereby melted in advance and is charged into the mold 32 through a small bore 35 provided therein. The outer diameter of the core 31 must be strictly determined, since it strongly influences the clamping property of the waterproof nut completed. Since the synthetic resin shrinks after it has been molded, the outer diameter of the core 31 is set so as to be 0.02 to 0.1 mm larger than the nominal diameter of the nut body 30, preferably 0.04 to 0.06 mm larger than the latter in order that the amount of contact between the internal thread ridge of the cap-shaped portion formed of the synthetic resin and the external thread ridge of the bold which is screwed into the nut is within a desired range.

The nut body 30 is mainly made of a metal. Since it is screwed onto the core 31 in the form of a bolt, the nut body 30 is over-tapped so that the inner diameter thereof is slightly larger than the nominal diameter by about 0.05 to 0.4 mm in general, preferably about 0.1 to 0.3 mm. However, if the nut body 30 is excessively over-tapped, it undesirably becomes easy for the synthetic resin to enter the gap between the engaged core 31 and the nut body 30 when the resin is charged.

As to the kind of synthetic resin which is to be charged, it is preferable to employ a nylon resin among the aforementioned resins from the viewpoint of availability and strength. In addition, a filler or the like may be added according to need, and the mixing ratio of a filler is preferably 10 to 60%, more preferably 30 to 50%, from the overall viewpoint of reinforcing effect, external appearance and moldability.

In a practical example of the method of manufacturing the waterproof nut according to the present invention, a core 31 having a length of 25 mm and an outer diameter of 12.05 mm (the nominal diameter+0.05 mm) was employed, and the inner peripheral surface of the nut body 30 was over-tapped so that the inner diameter thereof was 0.2 mm larger than the nominal diameter, the nut body 30 having been subjected to deposition so that the deposit thickness is 20 μm.

The core 31 was inserted into a cavity 34 in the mold 32 which had the same configuration as the external shape of the waterproof nut, and the core 31 was fixedly set. Then, nylon 6,6 (containing 40% of short glass fibers) was injected into the cavity 34 by an injection molding machine (not shown).

According to experiments, when the temperature of the mold 32, the core 31, etc., was 80° C. or more, the resin undesirably entered and completely filled up the small space 33 between the nut body 30 and the core 31, so that it was impossible to unscrew the core 31 from the nut body 30. However, it was possible to prevent the resin from entering the small space 33 by charging the resin in a state wherein the temperature of the mold 32 and the core 31 was controlled so as to be 50° C. or less. When the mold temperature was 45° C. or less, it was particularly easy to unscrew the core 31 from the nut body 30.

The strength of the waterproof nut thus obtained was measured by variously changing the amount of contact between the internal thread ridge of the cap-shaped portion and the external thread ridge of the bolt screwed into the nut. More specifically, waterproof nuts which were different from each other in terms of the thread diameter of the cap-shaped portion were obtained by properly selecting the diameter of the threaded portion of the core 31, and then a marketing M12 bolt which had been subjected to electroplating was screwed into each of the waterproof nuts. Table 1 shows the thread ridge contact amount and the breaking torque strength of each of the waterproof nuts. Examples 1 to 3 allowed the bolt to be smoothly and effectively screwed thereinto, but Example 4 was slightly tight for the bolt as compared with Examples 1 to 3. However, all of them had a satisfactory high strength and were able to endure easily an ordinary clamping operation with an impact wrench. Example for comparison had a contact amount of 0 mm, which means that the bolt was in thread engagement with the nut body alone. In consequence, the breaking torque strength is extremely low, and this waterproof nut cannot be practically used.

TABLE 1

|  | Example 1 | Example 2 | Example 3 | Example 4 | Example for comparison |
|---|---|---|---|---|---|
| Contact amount (mm) | 0.5 | 0.8 | 0.9 | 1.2 | 0 |
| Breaking torque strength (kg · cm) | 600 | 900 | 1100 | 720 | 350 |

Table 2 shows the results of a vibration test carried out on the waterproof nut of the present invention. In this test, after members to be joined had been fastened together with an axial force of 1.5 ton, sine-wave vibrations with an amplitude of ±1.0 mm were applied in a direction perpendicular to the axial direction of the nut and bolt assembly, and the residual axial force was examined after the nut and bolt assembly had been vibrated 1,000 times.

TABLE 2

|  | Examples for comparison | | | Example 5 |
|---|---|---|---|---|
|  | SUS 304 | Titanium | SS 41 | Resin nut and bolt |
| Residual axial force $Q_z$ (ton) | 0.05 | 0 | 0.35 | 0.93 |
| Residual axial force ratio $Q_z/Q_0$ (%) | 3 | 0 (bolt broken) | 23 | 62 |

*The head of the bolt employed in Example 5 is coated with nylon.

As will be clearly understood from Table 2, the nut and bolt assembly which includes the waterproof nut according to the present invention is less than the metallic nut and bolt assemblies in terms of the degree of looseness brought about by the vibration and has a higher residual axial force ratio than those of the latter.

The resin-coated waterproof nut of the present invention has the same torque strength as a normal metallic nut. Prior resin coated nuts could not provide the same torque strength as metallic nuts. The present invention requires a metallic nut body having internal threads, a layer of synthetic resin covering the periphery and front surface of the nut body and having a thickness of at least 1 mm at the front surface in a preferred embodiment.

The nut also has a cap-shaped portion integrally connected with the layer of synthetic resin and disposed over the rear surface of the nut. The cap-shaped portion has an internal thread which is contiguous with the internal thread of the nut body so as to provide an interference fit with a bolt. And, an outer part of the cap-shaped portion is formed in order to engage a tool for tightening the nut.

The high torque strength of the nut of the present invention is achieved: by the contact between the internal thread ridge of the cap-shaped portion and the thread ridge of a bolt being screwed into the nut, and by the resin covering on the front surface of the nut. When the amount of contact is within the claimed range the deformation of the cap-shaped portion is limited. Therefore, the cap-shaped portion will not break from the rotational force of a tool on its outer periphery.

Table 3 below compares the torque strength of the claimed nut with conventional nuts and illustrates the results obtained by the claimed invention.

TABLE 3

| Sample No. | Kind | Material | Torque Strength (kg · cm) | Broken Mode |
|---|---|---|---|---|
| 1. | metal | SS41 | 900–1,100 | Bolt is broken. |
| 2. | all resin | Nylon 6,6 | 200–300 | Screw thread is broken. |
| 3. | metal and resin | SS41 + Nylon 6,6 | 300–500 | Metal insert comes off. |
| 4. | An Example used in the present invention | SS41 + Nylon | 900–1,100 | Bolt is broken. |

The metallic nut (Sample No. 1) shown in the Table 3 has a high torque strength and, therefore, the bolt to be screwed to the metallic nut is broken.

Also, in the all resin nut (Sample No. 2), the torque strength is as low as ⅓–1/5 of the metallic nut. Therefore, the all resin nut can not be applied for construction.

In addition, the resin and metal nut (Sample No. 3) is produced by inserting the metallic nut into resin material, but the torque strength of the nut is low, so that the metallic nut (insert) comes off from the resin cover, when the nut is revolved by a tool such as a spanner. Therefore, the nut (Sample No. 3) can not be applied for construction as a waterproof nut having a high torque strength (kg. cm).

It can be readily seen that the present invention, Sample 4., has the same high torque strength as a metallic nut normally used in construction. It can also be readily seen that a resin nut and a resin coated metallic nut of the prior art are damaged at a much lower torque strength. Only the nut of the present invention has the desired strength combined with the waterproof quality that is required for use in water storage tanks and in pipes.

The torque strength of the nut is assisted by a resin covering on the front surface of the nut. The resin covering on the front surface of the nut prevents the nut from becoming separated from the cap-shaped portion at low torque strength, as occurred with sample 3 above.

Table 4 shows the relationship between the thickness of the front surface covering layer and the torque strength.

TABLE 4

| Sample No. | Thickness (mm) | Torque Strength (kg · cm) | Broken Mode |
|---|---|---|---|
| 5. | 0 | 500–600 | Metallic insert comes off. |
| 6. | 1 | 800 | Bolt is broken. |
| 7. | 3 | 960 | Bolt is broken. |

*Size of bolt & nut: M12

In Sample 5, no cover layer occurs on the front surface of the nut and the synthetic resin outer layer is removed from the periphery of the nut at low torque strength. Sample 6, with a front surface covering layer of 1 mm, has a torque strength 33 to 60% higher than that of Sample 5. As the thickness of the front surface covering layer increases from 1 mm to 3 mm the torque strength of the nut of the present invention increases. This is believed to be because the front surface covering layer is contiguous with and reinforces the outer layer.

In the above Samples a set of M12 bolt and nut is used, but the present invention can be applied to all sizes of bolt and nut sets. Table 5 below compares the torque strengths of various bolt and nut sets. In each example the nut of the present invention performs as well as the metallic nut without loss of its waterproof resin coating.

TABLE 5

| | Torque Strength (kg · cm) | |
|---|---|---|
| Size | Waterproof nut of the present invention | metallic nut |
| M6 | 120 (Bolt is broken) | 100–120 (Bolt is broken) |
| 8 | 250 (Bolt is broken) | 200–250 (Bolt is broken) |
| 10 | 500 (Bolt is broken) | 450–500 (Bolt is broken) |
| 12 | 1,100 (Bolt is broken) | 900–1,100 (Bolt is broken) |
| 16 | 2,700 (Bolt is broken) | 2,500–2,700 (Bolt is broken) |
| 20 | 4,700 (Bolt is broken) | 4,500–4,700 (Bolt is broken) |
| 24 | 5,600 or more (Bolt is broken) | 5,600 or more (Bolt is broken) |

Features of the waterproof nut according to the present invention are its unusually high resistance to loosening by a vibrating force. As noted from Table 2 the waterproof nut of the present invention is more resistant to loosening brought about by vibration and has a higher residual axial force ratio the metallic nut.

Table 6 below shows the results of the loosening test effected on the basis of NAS 3350 Standard. The nut of the present invention has a resistance to loosening 90 fold greater than the comparable metallic nut based upon loosening time.

TABLE 6

| Sample No. | Kind | Initial Clamping Torque | Loosening Time |
|---|---|---|---|
| 8 | Water-proof of the present invention | 400 kg · cm. | 1800 seconds or more |
| 9 | Metallic | 400 kg · cm. | 20 seconds |

TABLE 6-continued

| Sample No. | Kind | Initial Clamping Torque | Loosening Time |
|---|---|---|---|
| | nut | | |

*M12 bolt and nut used
Vibration applied: 1,780 (29.3Hz)

Figure 11:
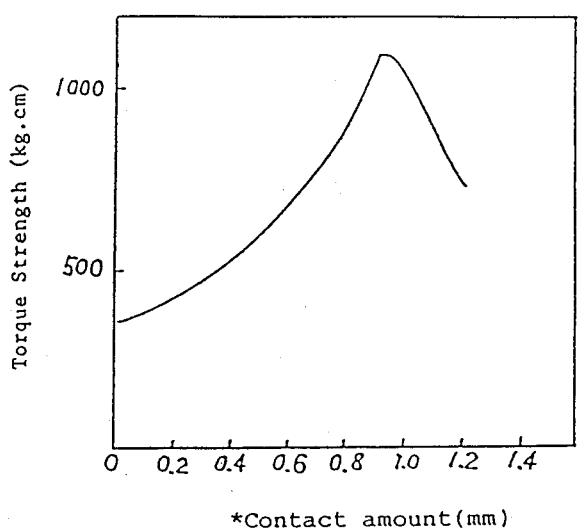
FIG. 11 is a graph showing the contact among and torque strength of the waterproof nut.

The reasons why the nut of the present invention has the same torque strength as the metallic nut are as follows: (1) One of the reasons is because the contact amount, that is, contact between the internal thread ridge of the cap-shaped portion and the thread ridge of the bolt to be screwed thereto, is set to a proper range. The contact amount in Table 1 is shown in FIG. 11.

That is to say, in order to obtain a high torque strength the contact amount is very important, and that of the present invention is set to 0.4 to 1.2 mm, more preferably 0.7–1.1 mm, so as to obtain the high torque strength. In the above present invention (Sample No. 4) the contact amount between the internal thread ridge of the cap-shaped portion and the thread ridge of the bolt is 0.6 mm. In the present invention since the contact amount therebetween is set to the proper range, the deformation of the resin cap-shaped portion is restricted to a small amount by the friction of the contact portion even when the present waterproof nut (Sample No. 4) is claimed and screwed at its outer periphery by such a tool as a wrench, so that the cap-shaped portion is prevented from breaking.

Comparison between the present invention and a Hard-Lock nut:

The Hard-Lock nut which is made by HARD LOCK CORPORATION is constituted by an upper nut and a lower nut.

Figure 12:
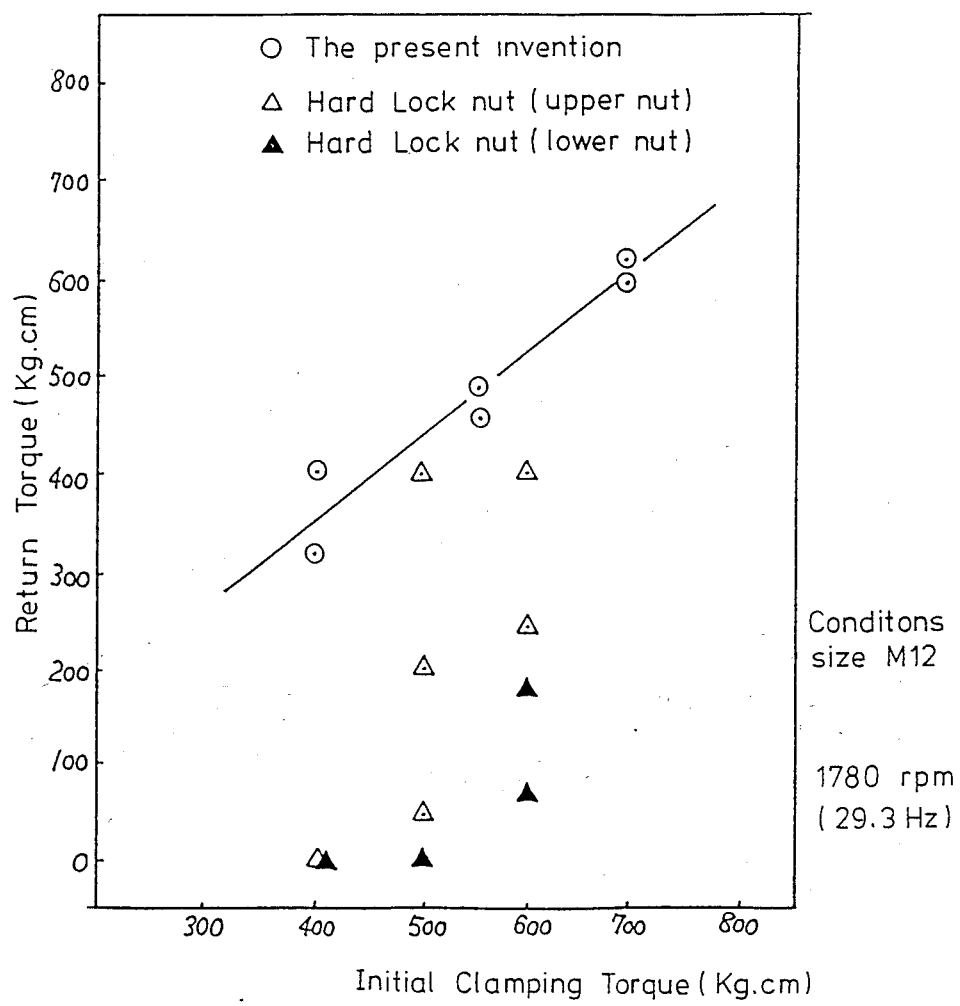
FIG. 12 is a graph showing the initial clamping torque and return torque in a result of a comparison test between the present invention and a Hard-lock nut.

FIG. 12 is the result of the test effected on the basis of U.S. NAS 3550 STANDARD, showing the relationship between initial clamping torques of a set of bolt and nut and return torques of the set which has been subjected to vibration for 30 minutes.

As understood from FIG. 12, the waterproof nut of the present invention has less looseness and higher return torque than that of the Hard-Lock nut.

As set forth above, the waterproof nut according to the present invention has a high water-proof property, a high torque strength and a high resistance to looseness, which are very useful in industrial applications.

Figure 13:
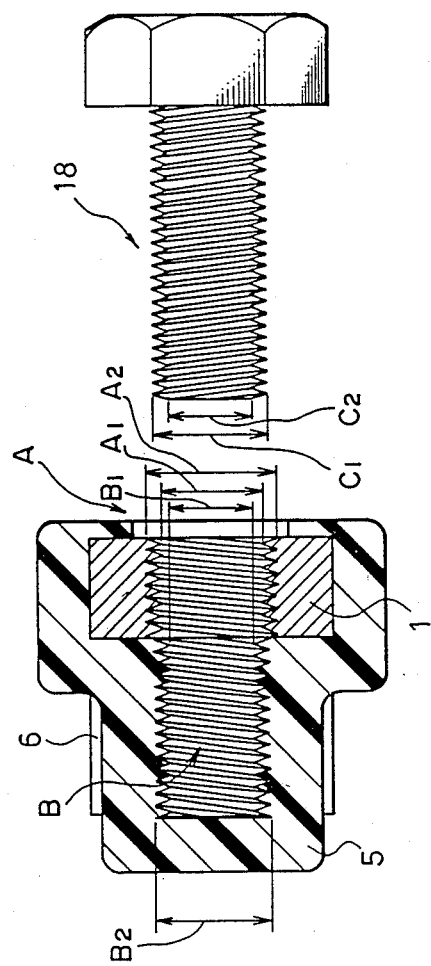
FIG. 13 is an enlarged sectional view of the waterproof nut of the present invention and a bolt applied thereto.
Figure 14:
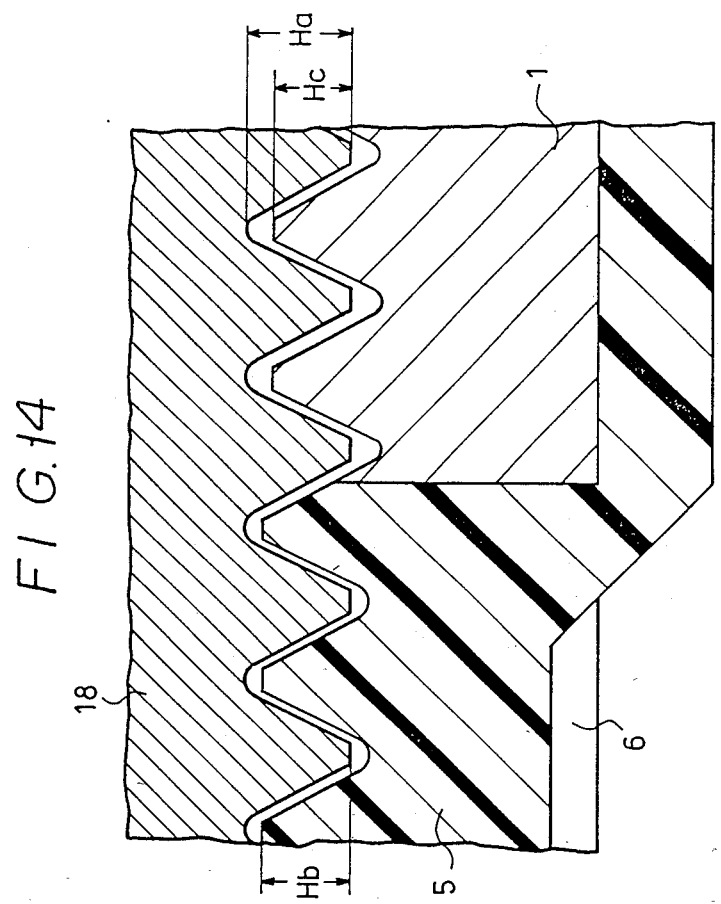
FIG. 14 is an enlarged sectional partial view showing relation of engaging a metal nut and a cap-shaped portion of the water-proof nut of the present invention with the bolt.
Figure 15:
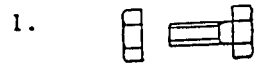
FIG. 15 is an illustration of each structure of samples of conventional nuts and bolts, and the waterproof nut of the present invention referred in Table 3 of the specification in which torque strength thereof is compared with each other.
Figure 15:
Figure 15:
Figure 15:

FIGS. 13 and 14 show important constructional elements of an embodiment of the present invention which are represented by the relation between the diameter A of the metal nut 1 embedded in the synthetic resin and the diameter B of the cap-shaped portion 5 of the synthetic resin material. The diameter A of the nut includes the minor diameter A1 and the major diameter A2 of the internal thread. And the diameter B of the cap-shaped portion includes the minor diameter B1 and the major diameter B2 of the internal thread.

The noticeable features are in the relation between the diameters B and C as well as the diameters A and B. The diameter C of the bolt 18 which is engaged in the nut 1 and the synthetic resin cap-shaped portion 5, includes the major diameter C1 and the minor diameter C2 thereof.

The relation between the respective diameters A, B, and C in an example is explained as follows:

The thread overlap percentage between the nut and bolt, that is, the diameters A and C thereof is about 20–95%. Namely, the overlapping area Hb between the thread of the cap-shaped portion 5 and the thread area Ha of the bolt 18 is greater than the overlapping area Hc between the thread of the metal nut 1 and the thread area Ha of the bolt 18 as shown in FIG. 14. And, the thread overlap percentage between the capshaped portion and bolt, that is, the diameters B and C thereof is about 40–100%. The tightness between the cap shaped portion 5 and the bolt 18 is greater than the tightness between the nut 1 and the bolt 18.

In other words, the percentage of the thread overlap between the cap-shaped portion 5 and the bolt 18 when engaged is about 40–100%, that is the external ridge of the bolt is over-lapped in the internal groove of the cap-shaped portion 5 in about 40–100%. In case that the thread overlap value is 100% between the bolt and the cap-shaped portion, both the bolt and cap correspond completely, and are securely engaged therebetween. In case that the thread overlap value is 40% between the bolt and the cap, the diameter C of the bolt 18 is slightly smaller than the diameter B of the cap, namely, the bolt 18 is slightly thinner than the opening diameter of the cap, and the external ridge of the bolt is overlapped with the internal groove of the cap in the proportion of 40%.

The above stated relation between the bolt and the cap can be applied to the relation between the body and the nut embedded in the cap-shaped portion of the synthetic resin. Both the bolt 18 and nut 1 are thread overlapped in about 20–95%, and do not completely correspond or are not engaged with each thread crest of the bolt and the root of the nut. Namely, the diameter A of the nut is slightly larger than the diameter C of the bolt 18, and there is such difference between both the diameters A and B of the nut and cap-shaped portion as shown in FIG. 14 showing the enlarged sectional view of the 3 elements attached herewith.

For example, in the thread of M-12 type in the Standard, the actual difference between both the diameters A and B of the nut 1 and cap-shaped portion 5 is about from 0.4 to 1.2 mm. But, this value is only one example.

The following effects are obtained from the above stated features of the present invention:

(a) When the bolt 18 is engaged in the cap-shaped portion 5 in a small measure, the intrusion occurs therebetween, though such intrusion does not scarcely occur between the nut and the bolt 18. Therefore, even though a support or pushing force on the bolt is removed therefrom. Accordingly, for example, it becomes very easy to work with them at the high place.

(b) Once the bolt 18 is completely engaged in the cap-shaped portion of the synthetic resin material, any looseness of the bolt from the cap-shaped portion 5 is prevented, though such looseness may occur between only metal bolt 18 and nut combination. The looseness does not occur in the present invention.

(c) Because the bolt and the cap-shaped portion are tightly secured therebetween, therefore, even though the outer portion of the cap-shaped portion is not an integral metal member, the cap-shaped portion can be rotated by a spanner or wrench, and the synthetic resin member is not broken nor twisted off.

As has been described above, it is possible, according to the present invention, to economically produce a waterproof nut which can be smoothly and effectively screwed onto a bolt and has an advantageously large breaking strength. In addition, the waterproof nut according to the present invention is so designed that it is effectively prevented from loosening. Thus, the waterproof nut obtained by the present invention, together with a resin-coated bolt, can be used in food industry equipment, marine structures, chemical plants, vehicles and various other fields in which corrosion resistance is required, to say nothing of water storage tanks, and as a nut and bolt assembly which is resistant to loosening.

We claim:

1. A waterproof nut which is to be screwed onto a bolt having an external thread, comprising:
   (a) a metal nut body having an internal nut thread formed on the inner periphery thereof;
   (b) an outer layer which covers the outer periphery of said nut body, said outer layer being made of synthetic resin;
   (c) a front surface covering layer integrally connected with said outer layer and partially covering the front surface of said nut body, the thickness of said front surface covering layer being at least 1 mm;
   (d) a cap-shaped portion integrally connected with said outer layer and disposed over the rear surface of said nut body so as to cover the free end of the bolt which is screwed into said nut body in such a manner that said free end projects from the rear surface of said nut body, said cap-shaped portion being provided with a constant diameter internal cap thread which is contiguous with the internal nut thread of said nut body;
   (e) a non-circular portion formed on the outer periphery of said cap-shaped portion for engagement with a tool to screw said nut onto said bolt; and
   (f) a thread overlap percentage by which the external thread of the bolt radially engages the internal cap thread of the cap-shaped portion being greater than a thread overlap percentage by which the external thread of the bolt radially engages the internal nut thread of the nut body for the length of the cap-shaped portion to insure that the cap-shaped portion withstands a rotational force applied to said non-circular portion to screw said nut onto said bolt.

2. A waterproof nut according to claim 1, wherein said front surface covering layer covers the front surface of said nut body except for the portion in which said internal thread is formed.

3. A waterproof nut according to claim 2, wherein the inner end of said front surface covering layer defines a step.

4. A waterproof nut according to claim 3, wherein the thickness of said front surface covering layer is gradually reduced toward the internal thread portion of said nut body, thereby enabling a flexible packing material for sealing to be accurately and effectively positioned when said nut is tightened onto said bolt.

5. A waterproof nut according to claim 1, wherein said front surface covering layer is provided with a circular groove for engagement with a resin washer, so that said washer is snap-fitted into the groove.

6. A waterproof nut according to claim 1, wherein said synthetic resin is selected from polyamide, ester, ether, sulfone and sulfide resins.

7. The waterproof nut according to claim 1, wherein the thread overlap percentage between said internal nut thread of said metal nut body and the external thread of the bolt is 20 to 90%, and the thread overlap percentage between the internal cap thread of said cap-shaped portion and the external thread of the bolt is 40 to 100%.

8. A waterproof nut which is to be screwed onto a bolt having an external thread, comprising:
   a metal nut body having an internal nut thread formed on the inner periphery thereof;
   a synthetic resin outer layer which covers the outer periphery of said nut body;
   a front surface covering layer integrally connected with said outer layer and partially covering the front surface of said nut body, the thickness of said front surface covering layer being at least 1 mm;
   a washer engaged with said front surface covering layer;
   a cap-shaped portion integrally connected with said outer layer and disposed over the rear surface of said nut body so as to cover the free end of the bolt which is screwed into said nut body in such a manner that said free end projects from the rear surface of said nut body, said cap-shaped portion being provided with a constant diameter internal cap thread which is contiguous with the internal nut thread of said nut body;
   a non-circular portion formed on the outer periphery of said cap-shaped portion for engagement with a tool to screw said nut into said bolt; and
   a thread overlap percentage by which the external thread of said bolt radially engages the internal cap thread of the cap-shaped portion being greater than a thread overlap percentage by which the external thread of the bolt radially engages the internal nut thread of the nut body for the length of the cap-shaped portion to insure that the capshaped portion withstands a rotational force applied to the non-circular portion to screw said nut onto said bolt.

9. A waterproof nut according to claim 8, wherein said washer is provided with a ring-shaped projection which is fitted into a ring-shaped groove formed in said front surface covering layer.

10. A waterproof nut according to claim 8, wherein said front surface covering layer covers the front surface of said nut body except for the portion in which said internal thread is formed.

11. A waterproof nut according to claim 10, wherein the inner end of said front surface covering layer defines a step.

12. A waterproof nut according to claim 11, wherein said washer is provided with a ring-shaped projection which engages with said step.

13. A waterproof nut according to claim 8, wherein the thickness of said front surface covering layer is gradually reduced toward the internal thread portion of said nut body, thereby enabling a flexible packing material for sealing to be accurately and effectively positioned when said nut is tightened onto said bolt.

14. The waterproof nut according to claim 8, wherein the thread overlap percentage between said internal nut thread of said metal nut body and the external thread of the bolt is 20 to 90%, and the thread overlap percentage between the internal cap thread of said cap-shaped portion and the external thread of the bolt is 40 to 100%.

15. The waterproof nut according to claim 8, wherein said synthetic resin is selected from polyamide, ester, ether, sulfone and sulfide resins.

* * * * *